United States Patent
Vaughn

(10) Patent No.: US 9,324,189 B2
(45) Date of Patent: Apr. 26, 2016

(54) AMBULATORY SYSTEM TO COMMUNICATE VISUAL PROJECTIONS

(71) Applicant: Intel Corporation, Santa Clara, CA (US)

(72) Inventor: Robert L. Vaughn, Albuquerque, NM (US)

(73) Assignee: Intel Corporation, Santa Clara, CA (US)

( * ) Notice: Subject to any disclaimer, the term of this patent is extended or adjusted under 35 U.S.C. 154(b) by 77 days.

(21) Appl. No.: 14/040,551

(22) Filed: Sep. 27, 2013

(65) Prior Publication Data

US 2015/0092020 A1    Apr. 2, 2015

(51) Int. Cl.
| | |
|---|---|
| H04N 7/18 | (2006.01) |
| H04N 15/00 | (2006.01) |
| G06T 19/00 | (2011.01) |
| G06F 13/00 | (2006.01) |
| H04N 13/00 | (2006.01) |
| H04N 13/02 | (2006.01) |
| H04N 13/04 | (2006.01) |

(52) U.S. Cl.
CPC ............. *G06T 19/006* (2013.01); *G06F 13/00* (2013.01); *H04N 13/0059* (2013.01); *H04N 13/0203* (2013.01); *H04N 13/0459* (2013.01)

(58) Field of Classification Search
CPC ............. G06K 9/3241; G06T 7/0018; H04N 13/0282; H04N 17/002; H04N 5/247
USPC .................................................. 348/47, 144
See application file for complete search history.

(56) References Cited

U.S. PATENT DOCUMENTS

| | | | | |
|---|---|---|---|---|
| 7,581,702 | B2 * | 9/2009 | Olson | G05D 1/0022 244/189 |
| 9,022,324 | B1 * | 5/2015 | Abhyanker | B64C 13/20 244/189 |
| 2002/0171927 | A1 * | 11/2002 | Barnes, III | G03B 21/00 359/451 |
| 2005/0259150 | A1 * | 11/2005 | Furumi | G09F 21/06 348/144 |
| 2008/0313937 | A1 * | 12/2008 | Boyce | G09F 19/18 40/212 |
| 2010/0195434 | A1 * | 8/2010 | Menger | G01V 1/005 367/16 |
| 2011/0292348 | A1 * | 12/2011 | Tobita | B64B 1/28 353/28 |

(Continued)

OTHER PUBLICATIONS

M. Neri, A. Campi, R. Suffritti, F. Grimaccia, P. Sinogas, O. Guye, C. Papin, T. Michalareas, L. Gazdag, I. Rakkolainen, Skymedia—UAV-Based Capturing of HD/3D Content with WSN Augmentation for Immersive Media Experiences, ICME IEEE Jul. 11-15, 2011.*

(Continued)

*Primary Examiner* — Jamie Atala
*Assistant Examiner* — Richard A Hansell, Jr.
(74) *Attorney, Agent, or Firm* — Blakely, Sokoloff, Taylor & Zafman LLP

(57) ABSTRACT

An ambulatory system to communicate visual projections. An embodiment of an apparatus for ambulatory communication includes: a propulsion system to enable the apparatus to fly, including to hover in place and to follow a user; a stereo camera to record an image of a user of the apparatus or a scene nearby the user of the apparatus; a transmitter to transmit video data generated by the stereo camera to a second apparatus via network for a communication with a remote user; a receiver to receive video data via the network from the remote user; and a video projection mechanism to project an image including the received video to the user.

26 Claims, 9 Drawing Sheets

(56) References Cited

U.S. PATENT DOCUMENTS

| | | | | |
|---|---|---|---|---|
| 2013/0073775 A1* | 3/2013 | Wade | ............... | H04N 7/181 710/316 |
| 2014/0233099 A1* | 8/2014 | Stark | ............... | G09F 21/06 359/446 |

OTHER PUBLICATIONS

H. Tobita, S. Maruyama, and T. Kuji, Floating Avatar: Telepresence System using Blimps for Communication and Entertainment, CHI 2011, May 7-12, 2011 Vancouver, BC, Canada, ACM 978-1-4503-0268-5/11/05.*

M. Neri, A. Campi, R. Suffritti, F. Grimaccia, P. Sinogas, O. Guye, C. Papin, T. Michalareas, L. GazdagJ. Rakkolainen, Skymedia—UAV-Based Capturing of HD/3D Content with WSN Augmentation for Immersive Media Experiences, ICME IEEE Jul. 11-15, 2011.*

T. M. Lippert, Display Devices: RSD (Retinal Scanning Display), 2001 by CRC Press LLC.*

F. Okura, M. Kanbara, N. Yokoya, Augmented Telepresence Using Autopilot Airship and Omni-directional Camera, IEEE International Symposium on Mixed and Augmented Reality 2010, Science and Technology Proceedings, Oct. 13-16, Seoul, Korea.*

Wrenn, Eddie, "Google Glasses on sale for $1,500: Firm launches prototype augmented reality eyewear with spectacular skydiving demo," published Jun. 28, 2012, retrieved at http://www.dailymail.co.uk/sciencetech/article-2165818/Google-Glass-augmented-reality-specs-available-NOW-1-500.html#ixzz1z760IhH4 on Mar. 4, 2014, 8 pages.

Tidwell, Michael et al., "The Virtual Retinal Display—A Retinal Scanning Imaging System," Human Interface Technology Laboratory, University of Washington, Seattle, Washington, retrieved at http://www.hitl.washington.edu/publications/p-95-1/ on Mar. 4, 2014, 11 pages.

Ridden, Paul, "Joggobot turns a quadrocopter into a running companion," Jun. 11, 2012, retrieved at http://www.gizmag.com/joggobot-autonomous-quadrocopter-running-partner/22899/ on Mar. 4, 2014, 3 pages.

Lewis, John R., "In the Eye of the Beholder, Scanning light beams to the retina could revolutionize displays for everything from cellphones to games," posted May 3, 2004, retrieved at http://spectrum.ieee.org/biomedical/imaging/in-the-eye-of-the-beholder on Mar. 4, 2014, 7 pages.

Schwartz, Evan I., "Technology Review, The Sound War, Focused beams of sound could direct music or speech to a single person in a crowd. Two inventors have staked competing claims to a potential audio revolution," May 2004, retrieved at http://www.woodynorris.com/Articles/TechnologyReview.htm on Mar. 4, 2014, 7 pages.

* cited by examiner

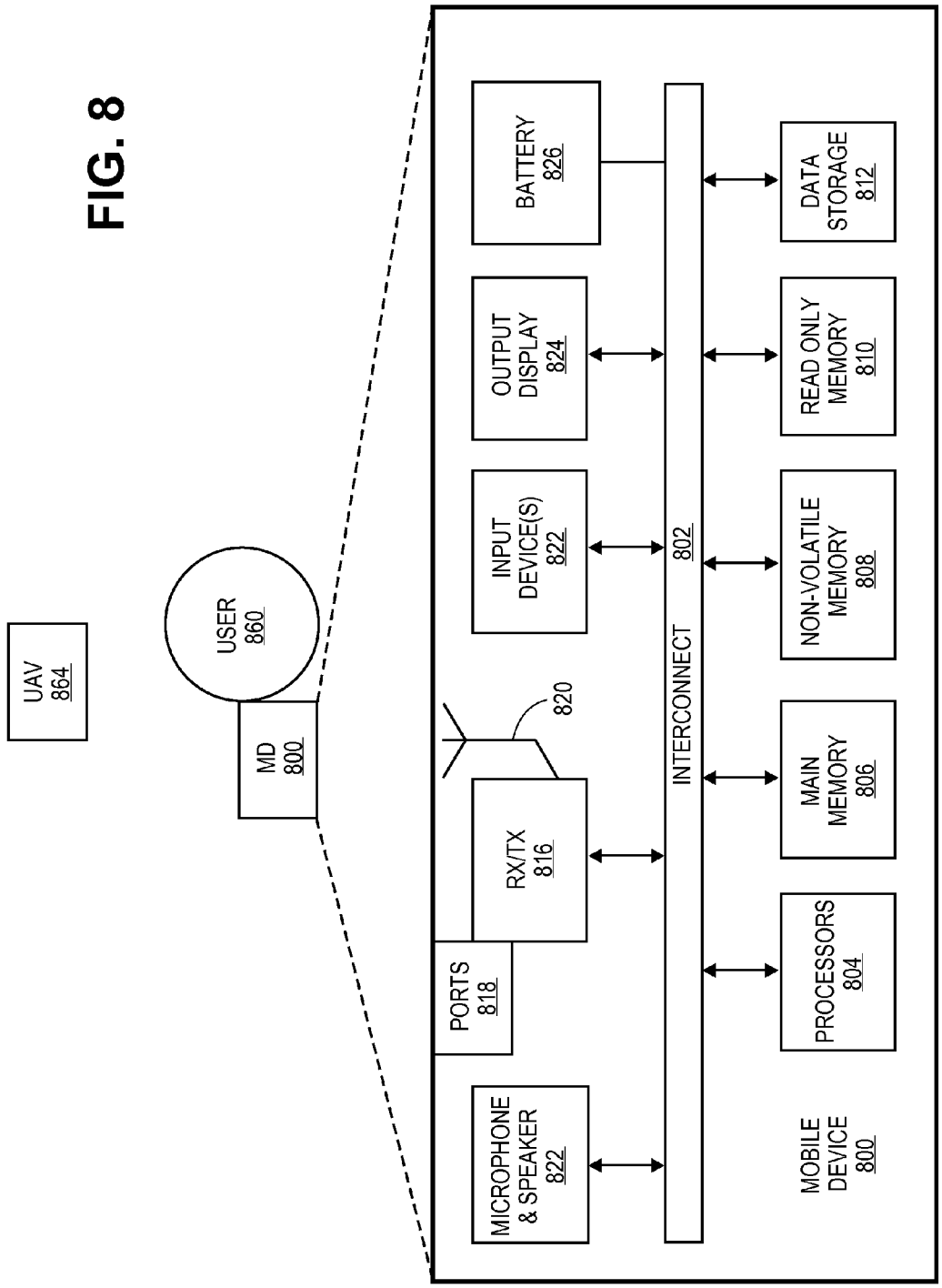

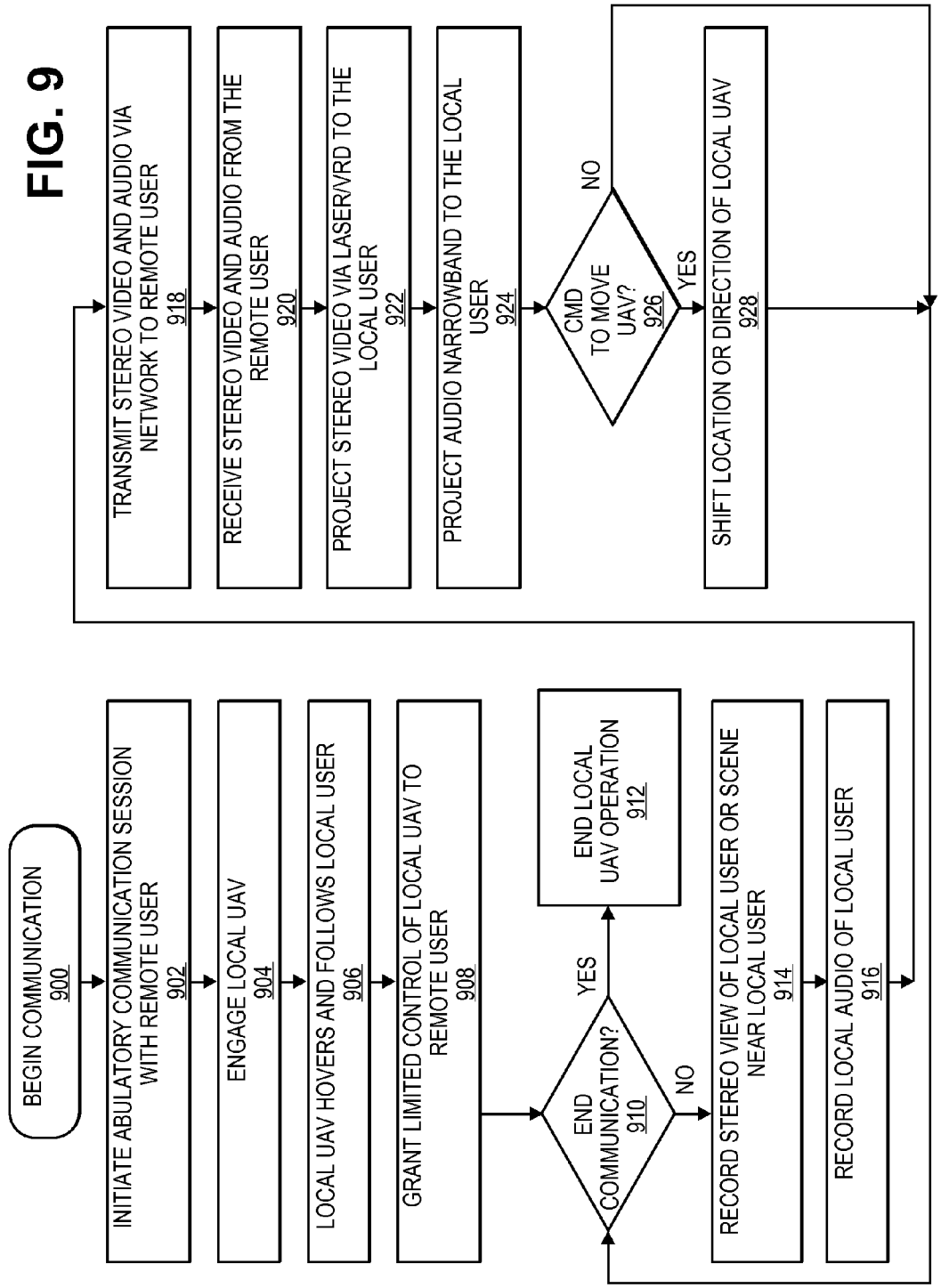

AMBULATORY SYSTEM TO COMMUNICATE VISUAL PROJECTIONS

TECHNICAL FIELD

Embodiments described herein generally relate to the field of electronic devices and, more particularly, to an ambulatory system to communicate visual projections.

BACKGROUND

As electronic communications advance, there are more opportunities to communicate with others in various settings using video and audio. Video conferencing, video telephone communications, and similar video tools have become more common and more affordable for users.

In video conferencing and other video communications, the tools for communications include the possibility of the user of mobile devices for communication, including the use of laptop computers and handheld devices, However, communications remain largely stationary during the communication operation. While a laptop computer, for example, is easily moved between locations, it is much more difficult to relocate the apparatus if a communication is in operation.

BRIEF DESCRIPTION OF THE DRAWINGS

Embodiments described here are illustrated by way of example, and not by way of limitation, in the figures of the accompanying drawings in which like reference numerals refer to similar elements.

FIG. 8 illustrates an embodiment of a mobile device according to an embodiment; and FIG. 9 is a flow chart to illustrate a process for providing communications according to an embodiment utilizing an autonomous device to send and receive visual and auditory projections.

DETAILED DESCRIPTION

Figure 1:
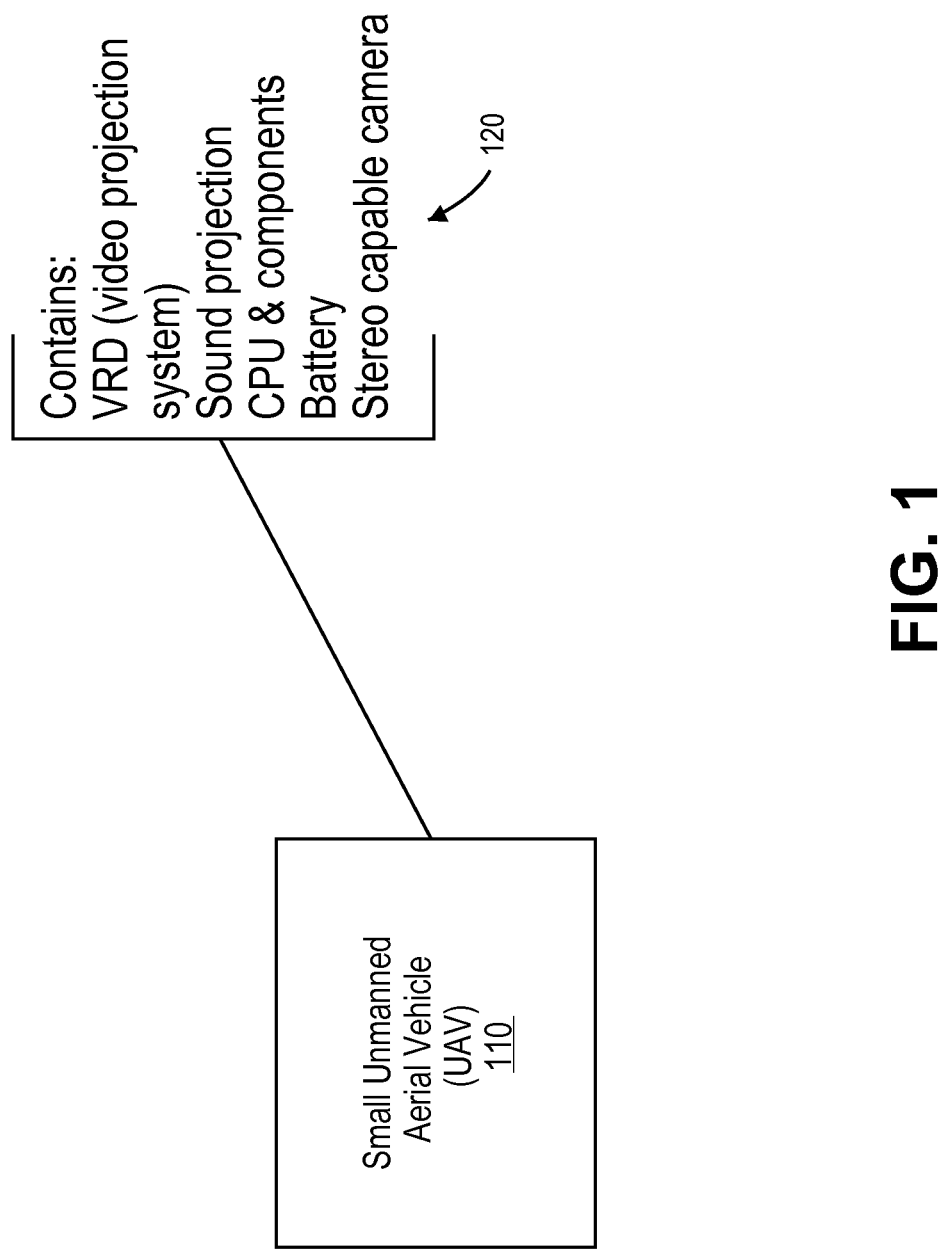
FIG. 1 is an illustration of components of an unmanned aerial vehicle (UAV) according to an embodiment.

Embodiments described herein are generally directed to an ambulatory system to communicate visual projections.

For the purposes of this description:

"Mobile device" means a smartphone, tablet computer, handheld computer, mobile Internet device, or other mobile apparatus that includes processing ability and communication ability.

"Unmanned aerial vehicle" or "UAV" means an apparatus that flies without a human pilot. As used herein, a UAV is a small device, the device generally being much smaller than a human user of the UAV.

In some embodiments, an ambulatory apparatus or system operates to communicate visual projections to provide multi-party, fully immersive and interactive augmented reality experience. In some embodiments, the ambulatory apparatus or system further operates to communicate auditory projections. In some embodiments, the apparatus or system utilizes a convergence of several technologies to provide enhanced communications, the apparatus or system utilizing one or more autonomous devices to record and project video for communications. In some embodiments, the apparatus further utilizes one or more autonomous devices to record and project audio for communications.

Virtual reality and augmented reality systems are becoming gradually more popular as the technology increases in quality. A conventional usage model involves a wearable element such as goggles or a helmet to allow the system to project images onto the user's eyes. The technology has advanced to a state where projected images may be convincing in their realism and usefulness. However, these systems generally are not very mobile using conventional technology, with the exception of augmented reality apps for devices such as smartphones and computer tablets. Google Glass is an example of existing technology that may be utilized to provide a virtual reality experience for a user.

However, a usage model for which there is no acceptable conventional solution is one in which two or more users, who are geographically dispersed, want to have an immersive virtual reality experience where the users can appear to be near to each other, see each other, and move with each other away from a location such as a conference room or desk even though such users may be thousands of miles away from each other.

In an example, a first person may be present in Oregon and a second person may be present in Hong Kong. Currently the parties may see and talk with each other using certain conventional technologies. For example, a PC web cam will provide video communications. The existing technology for such operations may include Cisco Telepresence. However, this type of technology is limited in that a system requires the users to be in front of a video and audio recording and transmitting device. In essence, both parties in a communication are required to remain in each party's local conference room, cubicle, or other similar location if they wish to have a "shared" communication experience.

In some embodiments, an ambulatory apparatus or system enables two or more users who are separated by significant distances, such as hundreds or thousands of miles, to walk together around, for example, an office, a home, a shopping mall, a beach, a purely virtual world, or a blended reality world.

In example, a first person in a first location may commence a conversation with a friend or colleague in a second location. In some embodiments, the parties could have a meeting while going for a walk. The first person would be able to see the second person walking next to the first person, and could look the second person in the eye while these individuals walked and talked together. In some embodiments, an apparatus or system provides the ability for the second person to see the first person and walk with the first person wherever such person is located. Further, the second person could virtually ride with the first person in an automobile or other form of transportation. In some embodiments, an apparatus or system would include software that is capable of stitching the vision together to make it appear the image appear to be seamless to each of the users.

In some embodiments, the parties to a communication could agree to meet virtually in location at which neither is physically present. For example, two parties may meet virtually at the Grand Canyon, and walk around the canyon, even though the first person is in Oregon and the second person is in Hong Kong. In this example, an apparatus or system includes software that operates to paint the background together for each of the parties to the communication.

In general, in order to enable a fully immersive multi-user virtual environment without restrictions on user movement or location, a system is capable of recording and transmitting video and audio from a real physical place that is near each user of the system. In order for a first person to view the second person and walk with the second person a device is required to be near each of the users to take the user's picture and record such users.

In conventional operations, a wearable element such as a headset and virtual reality goggles is needed for virtual reality connection. In some embodiments, an apparatus or system does not require wearable elements for communication. In some embodiments, an apparatus or system provides immersive virtual reality by utilizing elements to record and project video and sound from a location that is near each user, where such elements include the ability to move and track each user.

In some embodiments, an apparatus or system includes one or more small autonomous devices that are capable of hovering, tracking a user, projecting and recording video and sound. While the description herein generally describes a single autonomous device for simplicity, embodiments are not limited to a single autonomous device, and may include one or more autonomous devices. In some embodiments, the tasks for ambulatory communications may be divided among one or more autonomous devices.

The power of smartphones, including new phones utilizing processors such as the Intel Medfield processor, is increasing to the point where excess processing capabilities can be made available for new usage models. Battery power is also improving, though at a slow pace than processing capability. However, the extra battery power that is becoming available affords new components to be added to a smartphone.

In some embodiments, an apparatus or system utilizes laser projection to provide an image to a user. Laser projection systems are decreasing in size and power consumption, including pico projectors or projectors utilizing Texas Instruments DLP technology. Further, research has progressed on Virtual Retinal Displays (VRD), where laser images can be projected directly onto the user's eye.

In some embodiments, an apparatus of system provides for sound projection directed to a user without the sound being significantly audible to others. In some embodiments, an autonomous device provides for discretely directing sound to the user of the apparatus or system. In an example, research has occurred on parametric arrays utilizing heterodyning for projecting "ultrasonic" sound, where such sound projection provides for sound to be projected along a narrow beam such that only the targeted user would hear the sound.

Unmanned aerial vehicles (UAVs) have become significantly smaller and more sophisticated since such devices first became available. Such devices include a device presented by Regina Dugan of DARPA, the device being a robotic "hummingbird" that is capable of flying for several minutes, and a device developed by a research team from the Royal Melbourne Institute of Technology in which modified a commercially-available quadrocopter converted into an autonomous, flying running partner for solo joggers.

In some embodiments, an autonomous device for an ambulatory communication system is:

(1) Small in size, with the ability to fly, including hovering in place.

(2) Capable of staying near the user by tracking and following the user;

(3) Capable of projecting an image directly onto the user's eye or eyes via low power laser projection, where such technology may included virtual retinal display.

(4) Includes necessary software and hardware to stitch or merge virtual and real worlds together for the experience of the user.

In some embodiments, an autonomous device for an ambulatory communication system is further:

(5) Capable of projecting sound to the user in a narrow beam such that the intended user is the only person who is able to clearly hear the projected sound, although small amounts of sound leakage may occur.

While the operations are directed to an autonomous device, in some embodiments such operations may be shared between multiple devices. Further, certain features may be handled by a mobile device that is in the possession of or nearby the user and that is operating cooperatively with the autonomous device.

In some embodiments, an autonomous device provides services enabling ambulatory virtual reality experiences. In some embodiments, the autonomous device is an un-tethered apparatus that enables an ambulatory fully immersive multi-party virtual reality experience by combining (a) a small form factor UAV capable of hovering, (b) software that can identify and track a user, (c) virtual retinal display, (d) software methods for command and control, and (e) UAV to UAV communication systems in implementations in which two or more UAVs are used within proximity to a user. In some embodiments, optionally for blended reality the autonomous device further includes: (f) software methods for stitching together disparate scenes and backgrounds.

In some embodiments, the autonomous device further includes (g) parametric array utilizing heterodyning for projecting "ultrasonic" sound.

Additionally, in some embodiments an apparatus or system allows communication in which: (a) no user headset for sound is required, (b) no user goggles, glasses or lenses are required for video, (c) the system would allow for the remote viewer to obtain and maintain limited control of movement of the local device through the interpretation of the remote viewer (user) movements.

In some embodiments, a system allows for a remote viewer to obtain and maintain limited control of movement of the local autonomous device. In an example, the system allows a first person in a remote location to be able to look at a second person in a local location and to look away from second person, such as in response to the second person suggesting that the first person look at something in the local environment that the second person has pointed out. In some operations, the detection of the movement of the user generates a command that is transmitted to the remote device, the command directing the remote device to change a position of the remote device, change an alignment of the remote device, or both.

FIG. 1 is an illustration of components of a UAV according to an embodiment. In some embodiments, a system to provide ambulatory communication includes one or more UAVs to fly and operate as autonomous devices. In this illustration, a UAV 110 is represented as a box for simplicity, with the individual components to provide lift and control being known. The UAV 110 may be in the form of helicopter, a quadrocopter (quad-rotor helicopter), or other form that allows for hovering in place, moving to follow or move around a user, and turning to align towards the user or towards another location. The UAV may be referred to as a VR (Virtual Reality) UAV.

In some embodiments, a UAV includes the following components 120:

(a) A VRD (Virtual Retinal Display) video projection mechanism;

(b) A central processing unit (CPU) or other processor or processors and related components to operate the UAV;

(c) A battery or other power element to power the UAV; and (d) A stereo capable camera to capture video for communications, where the stereo video allows for providing an illusion of depth for the video image received by another user.

In some embodiments, a UAV further includes the following component:

(e) A sound projection mechanism.

Figure 2:
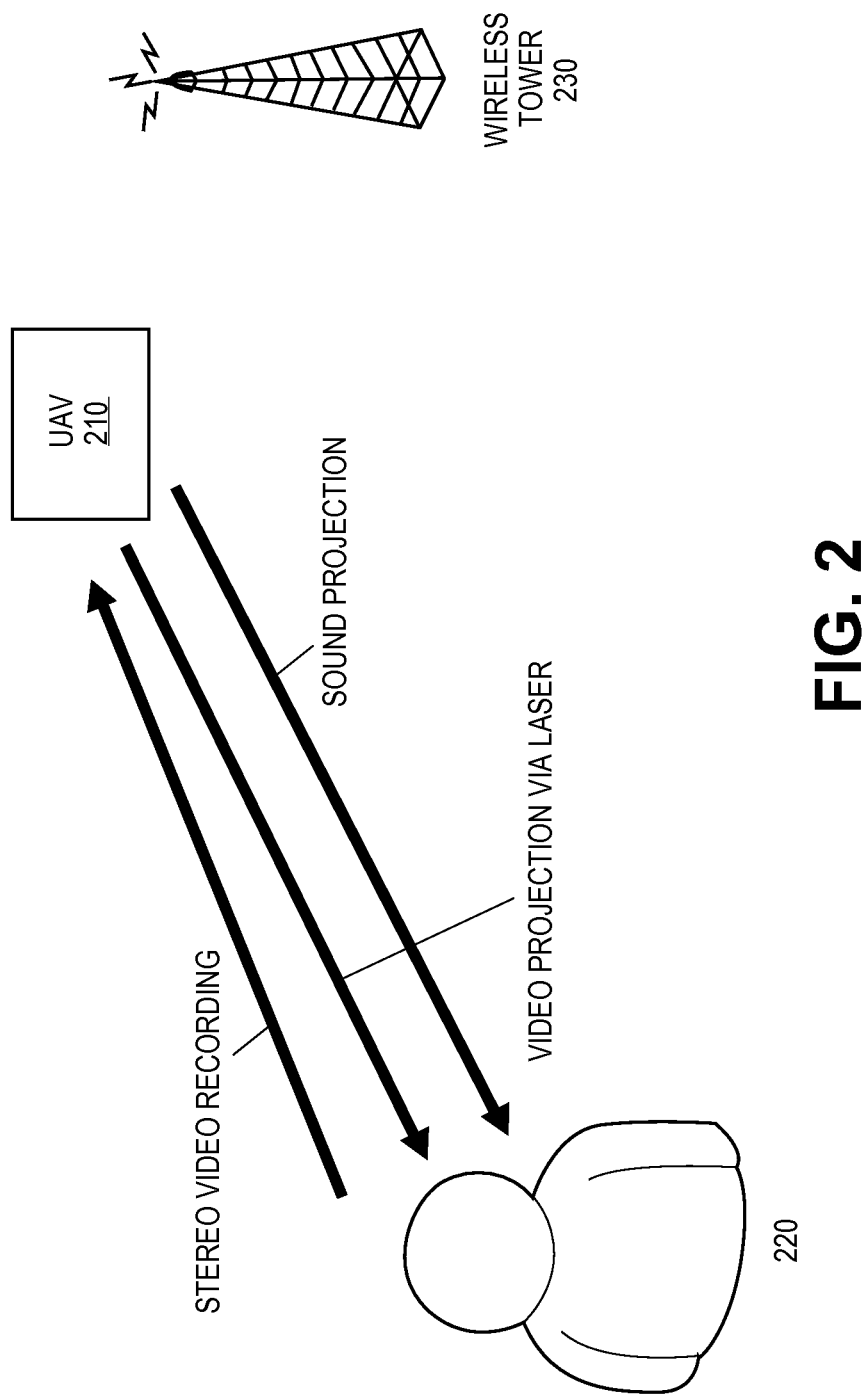
FIG. 2 illustrates basic interactions between a UAV, an end user, and a wireless system according to an embodiment.

FIG. 2 illustrates basic interactions between a UAV, an end user, and a wireless system according to an embodiment. In some embodiments, a UAV 210, such as UAV 110 (a VR UAV) illustrated in FIG. 1, is in communication with a local user 220 and with a wireless network, such as communication with a wireless tower 230, where the wireless tower provides a link to a wireless network to provide communications between the user 220 and a remote user, who is not shown in this illustration. The UAV 210 is illustrated as a single unit for simplicity in illustration, but embodiments are not limited to a single UAV and may include multiple UAVs, including a group or constellation of UAVs that are in communication with each other.

In some embodiments, the UAV 210 views the local user 220 or the local environment and generates a stereo video recording of the view. In some embodiments, the UAV 210 provides video to the local user, such as video projection via laser. In some embodiments, the UAV 210 provides audio to the local user, such as a narrowly focused sound projection. In some embodiments, while the UAV 210 is illustrated as being airborne, the UAV may land in resting position to save power if this can be done while continuing to provide operations in the system.

In some embodiments, the UAV 210 is engaged upon the commencement of a communication between the local user 220 and another user. In some embodiments, engagement of the UAV 210 may include the UAV 210 becoming airborne and hovering near the user 220. In some embodiments, the UAV 210 may have a storage location in which the UAV is located when not in operation. In some embodiments, the storage location may provide for charging of the battery of the UAV 210 when the UAV is not in operation.

Figure 3:
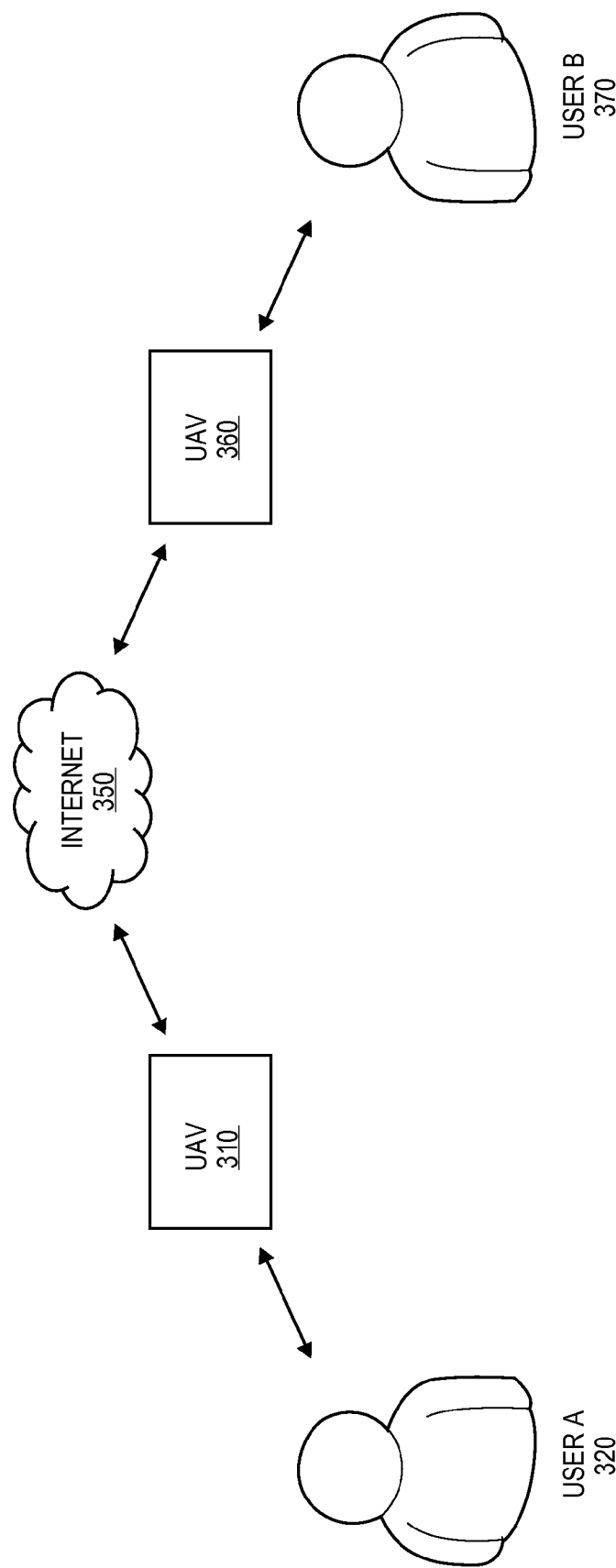
FIG. 3 illustrates a communication process between two end users according to an embodiment.

FIG. 3 illustrates a communication process between two end users according to an embodiment. In some embodiments, a first user, User A 320, is viewed by and provided visual images by a first UAV 310, while a second user, User B 370, is viewed by and provided visual images by a second UAV 360. In some embodiments, User A 320 is further provided audio by first UAV 310, and User B 370 is further provided audio by second UAV 360. In some embodiments, UAV 310 and UAV 360 have wireless access to the Internet 350 (or other network), such as, for example, the UAVs having cellular connections that result in connection to the Internet. In some embodiments, the wireless access to the Internet may be via mobile devices in the possession of the users, wherein the mobile devices operate cooperatively with the UAVs.

Figure 4:
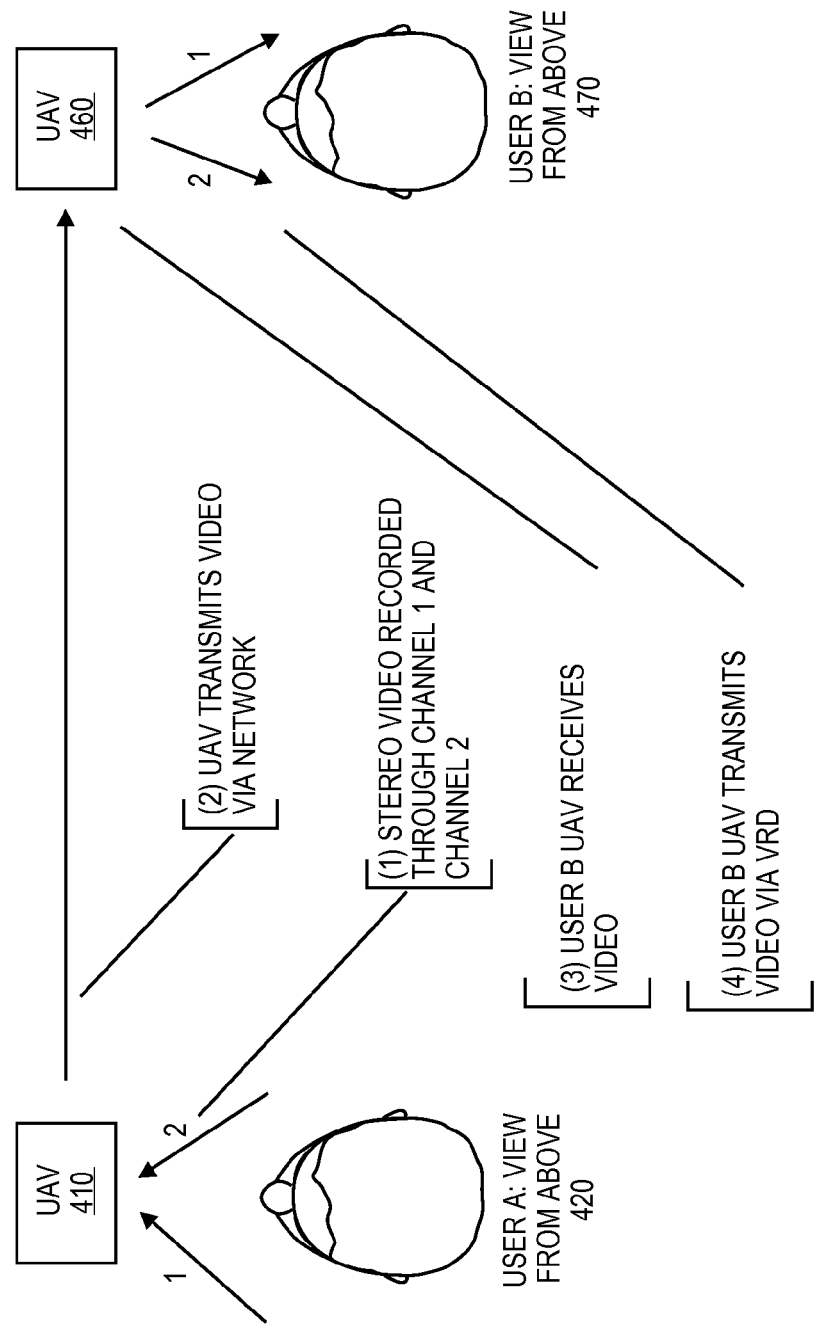
FIG. 4 illustrates a system and process for transmission of a realistic and spatially ambulatory image of a user to another user according to an embodiment.

FIG. 4 illustrates a system and process for transmission of a realistic and spatially ambulatory image of a user to another user according to an embodiment. In some embodiments, first UAV 410 records images of User A 420. In some embodiments, second UAV 460 operates to direct video images, and may also direct audio, to User B 470, who may be in a remote location far away from User A 420.

In some embodiments, a process for projecting a view of User A 420 to User B 470. In some embodiments, the process includes:

(1) Stereo video of User A 420 is recorded by UAV 410, such as recording video through two channels, referred to as channel 1 and channel 2.

(2) UAV 410 transmits the recorded video of User A 420 via a network or networks, which may include initial transmission via a cellular network, a wireless wide area network (WWAN), or other wireless network followed by data transmission via the Internet. In some embodiments, the video may be transmitted via a mobile device of User A 420.

(3) UAV 460 receives the video transmission via a cellular network, WWAN, or other wireless network. In some embodiments, the video may be received via a mobile device of User B 470.

(4) UAV 460 projects the channel 1 and channel 2 video of User A 420 to User B 470 via VRD technology, thus providing a three-dimensional image of User A that is viewed by User B.

Figure 5:
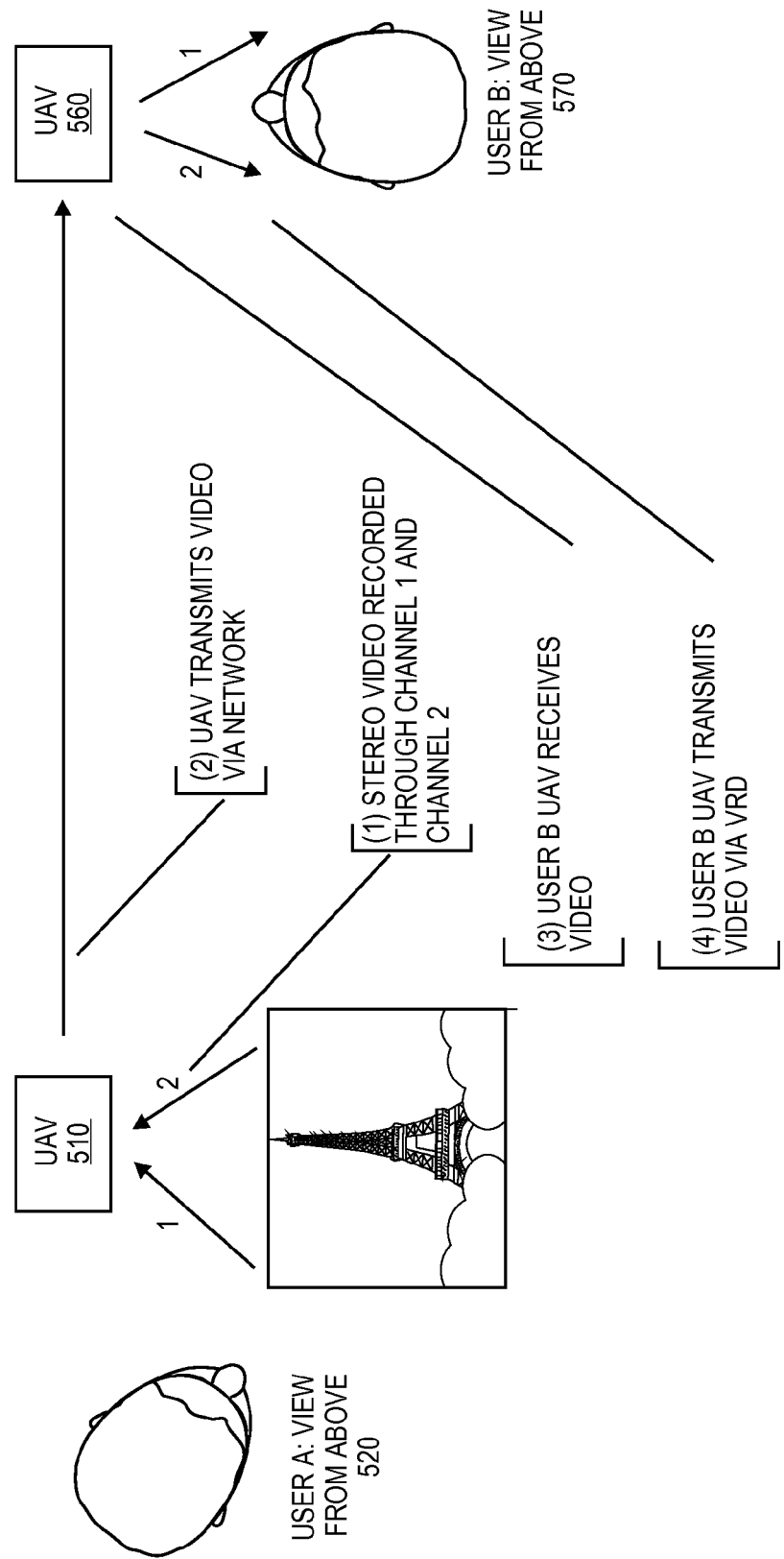
FIG. 5 illustrates a system and process for transmission of a realistic and spatially ambulatory image of a scene to a remote user according to an embodiment.

FIG. 5 illustrates a system and process for transmission of a realistic and spatially ambulatory image of a scene to a remote user according to an embodiment. In some embodiments, first UAV 510 records images of a scene that is near User A 520. In some embodiments, second UAV 560 operates to direct video images to User B 570, who may be in a remote location far away from User A 520. In this example, the Eiffel Tower (or any other location near User A) could be projected to User B 570. This example demonstrates the ability of User B to have limited control over User A's UAV. For example, User A 520 may direct the view of User B 570 to the scene, and User B 570 may control the direction of UAV 510 by, for example, turning towards the direction that User A 520 is facing, and thereby generating a command for UAV 510.

In some embodiments, a process for projecting a view of a scene near User A 520 to User B 570. In some embodiments, the process includes:

(1) Stereo video of the desired scene is recorded by UAV 510, such as recording video through two channels, referred to as channel 1 and channel 2. In some embodiments, UAV 510 is directed towards the scene by command that includes a command generated by User B 570, where User B 570 has been given limited ambulatory control over USV 510 by User A 520.

(2) UAV 510 transmits the recorded video of the scene via a network or networks, which may include initial transmission via a cellular network, a WWAN, or other wireless network followed by data transmission via the Internet. In some embodiments, the video may be transmitted via a mobile device of User A 520.

(3) UAV 560 receives the video transmission of the scene via a cellular network, WWAN, or other wireless network. In some embodiments, the video may be received via a mobile device of User B 570.

(4) UAV 560 projects the video of the scene to User B 570 via VRD technology. In some embodiments, if the command or action to direct UAV 510 to be directed towards the scene includes User B 570 changing a direction that User B facing, then the UAV 560 has either moved followed the change of direction of User B 570 or taken any other action necessary to maintain needed alignment with User B 570.

In some embodiments, to provide a fully immersive virtual reality experience, a system provides:

(1) Where each user is in a different geographic location, the users are able to view each other as if they were standing, sitting or walking near each other.

(a) Camera viewing User A is operable to track User A.

(b) Camera viewing User A is operable to transmit the image of User A for projection to User B.

(2) Each user has the ability to allow the other user to view remote scenes without compromising either viewer's ability to orient themselves spatially. In other words, each user can share the video from the other user without the user mistakenly moving into a dangerous location because of a loss of spatial orientation.

(a) In some embodiments, the maintenance of spatial orientation is managed through software. This is evolving technology that is currently used in automotive and robotic systems for identifying structures, other solid objects, and a road.

(3) In some cases the remote viewer can extend the remote viewer's experience spatially from the local viewer by, for example, moving around a corner. In that case the local viewer would lose "sight" of the remote viewer.

(a) In some embodiments, in this case the system recognizes that one "view" is the dominant view. In the case of the preceding example, User A would have the dominant view, wherein the dominant view allows User B to have limited control over User A's UAV.

In some embodiments, an apparatus, system, or method allows control of a device (UAV) based on a conversation, context and interactions between two or more people. In some embodiments, multi-party contextual hardware or software includes access control based on the immediate interactions between users. In some embodiments, limited access control of a UAV by a remote user is provided as follows:

(1) User A accepts a call on a device (wherein the call may be received via smartphone or via VR UAV) from User B.

(2) User B needs access to a service (wherein such service could be, for example, access to a camera or to the GPS service).

(3) The system on User A's device is made aware of the request for access from user B.

(4) The User A device grants permission for User B to obtain ambulatory control of the User A device. In some embodiments, control is provided where it is consistent with the observed interactions between two users.

Figure 6:
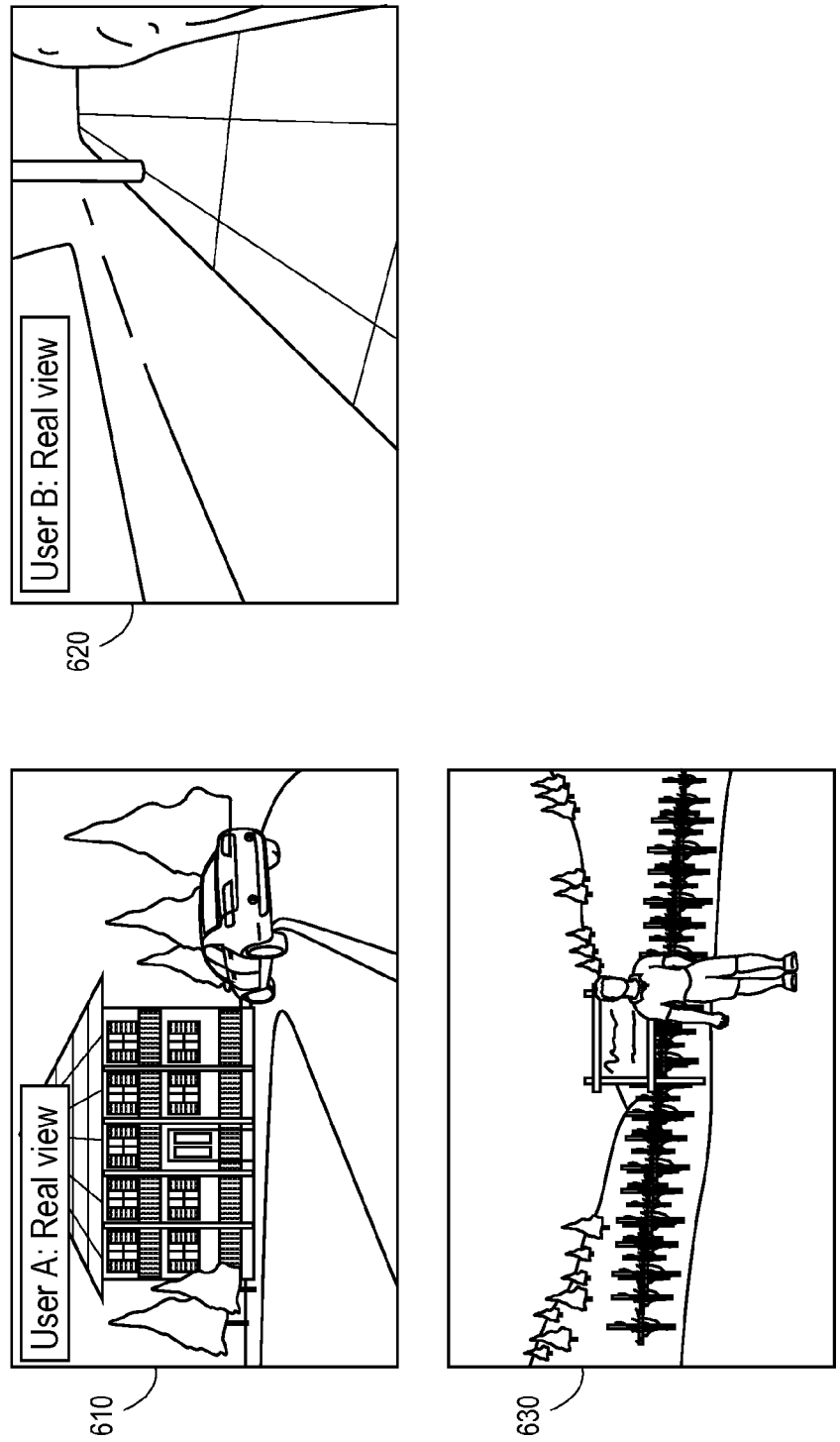
FIG. 6 is an illustration of projection of blended reality between users using UAVs and supporting software according to an embodiment.

In some embodiments, a modification of the operations illustrated in FIGS. 4 and 5 may include the use of a background of a location in which neither User A or User B is located, with the system thus generated a blended reality. FIG. 6 is an illustration of projection of blended reality between users using UAVs and supporting software according to an embodiment. In this illustration, User A is present in a first location 610 while User B is present in a second location 620. In some embodiments, a system provides an ambulatory communication whereby User A and User B are provided with a virtual reality (VR) location where neither of the users is present 630. In some embodiments, User A and User B are provided with a blended reality wherein each user sees the other user in the context of the VR location. In some embodiments, the software of the system provides for stitching together the images of the users in the VR location such that the users can tour through the location together, even though neither of the users is physically present in the VR location.

Figure 7:
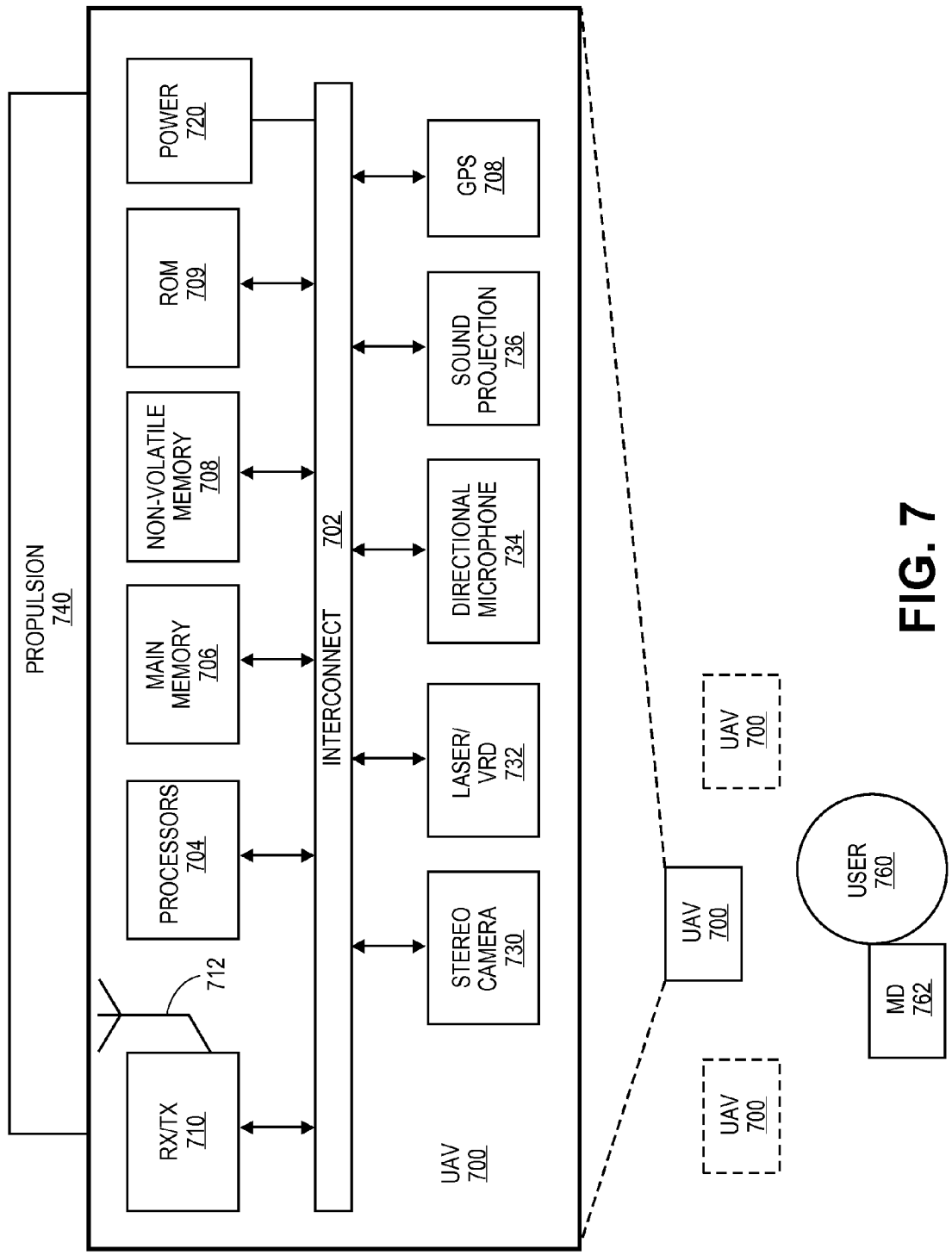
FIG. 7 illustrates an embodiment of an autonomous device or system according to an embodiment.

FIG. 7 illustrates an embodiment of an autonomous device or system according to an embodiment. In some embodiments, the autonomous device or system is a UAV 700, which may be referred to as a VR UAV. In this illustration, certain standard and well-known components that are not germane to the present description are not shown. Elements shown as separate elements may be combined, including, for example, a system on chip (SoC) combining multiple elements on a single chip.

In some embodiments, the UAV 700 may operate to receive video audio from and provide video and audio to a local user 760. In some embodiments, the UAV 700 may operate cooperatively with a mobile device (MD) 762, such as mobile device 800 illustrated in FIG. 8, to provide ambulatory communication operations for the local user 760. In some embodiments, the UAV 700, while generally described as a single autonomous device, may include a group or constellation of UAVs, where the UAVs may share the operations or mechanisms described here.

In some embodiments, the UAV 700 includes propulsion system 740, where the propulsion system 740 may include, for example, one or more rotors to provide propulsion and to allow the UAV 700 to become airborne, hover in place, rotate about one or more axes, and move in any direction. In some embodiments, the UAV 700 may be powered, propelled, and controlled by external sources, where such operation may include, for example, electronic magnets that lift and direct the UAV; microwave energy being provided to power the UAV; or other external forms of power, propulsion, or control.

Under some embodiments, the UAV 700 includes an interconnect or crossbar 702 or other communication means for transmission of data. The interconnect 702 is illustrated as a single interconnect for simplicity, but may represent multiple different interconnects or buses and the component connections to such interconnects may vary. The interconnect 702 shown in FIG. 7 is an abstraction that represents any one or more separate physical buses, point-to-point connections, or both connected by appropriate bridges, adapters, or controllers.

In some embodiments, the UAV 700 includes a stereo camera (or multiple cameras) 730 to enable the recording of stereo video of a local user or scene. In some embodiments, the UAV includes a laser video projection mechanism 732, such as a VRD mechanism, to enable the projection of stereo video received from a remote user (or other source) to the eyes of a local user.

In some embodiments, the UAV 700 includes a directional microphone 734 to enable the recording of audio from the local user or sounds near the local user. In some embodiments, a system may in addition or instead utilize a microphone of a mobile device 762 operating cooperatively with the UAV 700 to record audio. In some embodiments, the UAV 700 includes a sound projection mechanism 736, where the mechanism allows for projecting narrowly focused audio to the local user 760.

The UAV 700 may include a processing means such as one or more processors 704 coupled to the interconnect 702 for processing information. The processors 704 may comprise one or more physical processors and one or more logical processors. In some embodiments, the processors operate to control the propulsion 740 of the UAV 700, as well as operating to handle transmitted and received audio and video data.

In some embodiments, the UAV 700 includes one or more transmitters or receivers 710 coupled to the interconnect 702. In some embodiments, the UAV 700 may include one or more antennas 712 for the transmission and reception of data via radio signals. In some embodiments, the data that is transmitted and received includes audio and video data to be transmitted to a remote user and audio and video data received from a remote user. In some embodiments, the transmitters and receivers 710 may provide communication with, for example, a wireless network; with the mobile device operating cooperatively with the UAV; or with other UAVs within a group of UAVs.

In some embodiments, the UAV 700 further comprises a random access memory (RAM) or other dynamic storage device or element as a main memory and other memory (including memory buffers) 706 for storing information and instructions to be executed by the processors 704. RAM memory includes dynamic random access memory (DRAM), which requires refreshing of memory contents, and static random access memory (SRAM), which does not require refreshing contents, but at increased cost. DRAM memory may include synchronous dynamic random access memory (SDRAM), which includes a clock signal to control signals, and extended data-out dynamic random access memory (EDO DRAM). The UAV 700 may include one or more non-volatile memory elements 708, including, for example, flash memory, for the storage of certain elements. The UAV 700 also may comprise a read only memory (ROM) 709 or other static storage device for storing static information and instructions for the processors 704.

The UAV 700 may also comprise a power source 720, which may include a battery, a solar cell, a fuel cell, a charged capacitor, or other system or device for providing or generating power in an apparatus. The power provided by the power source 720 may be distributed as required to elements of the UAV 700, and will, for example, supply the power necessary to support the propulsion of the UAV 700. In some embodiments, the power source 720 may receive external power, including for example the receipt of microwave energy to power the UAV.

FIG. 8 illustrates an embodiment of a mobile device according to an embodiment. In this illustration, certain standard and well-known components that are not germane to the present description are not shown. Elements shown as separate elements may be combined, including, for example, an SoC combining multiple elements on a single chip.

In some embodiments, the mobile device 800 may work cooperatively with a UAV 864, such as the UAV 700 illustrated in FIG. 7, to provide ambulatory communication operations for a local user 860. In some embodiments, the mobile device 800 may operate to receive and transmit a portion or all of the video and audio data from and to the local user 860.

Under some embodiments, the mobile device 800 includes an interconnect or crossbar 802 or other communication means for transmission of data. The interconnect 802 is illustrated as a single interconnect for simplicity, but may represent multiple different interconnects or buses and the component connections to such interconnects may vary. The interconnect 802 shown in FIG. 8 is an abstraction that represents any one or more separate physical buses, point-to-point connections, or both connected by appropriate bridges, adapters, or controllers.

In some embodiments, the mobile device 800 includes a microphone and speaker 822. In some embodiments, the microphone may be utilized to enable the recording of audio from the local user for ambulatory communications. In some embodiments, a system may in addition or instead utilize a microphone of a UAV operating cooperatively with the mobile device 800 to record audio.

The mobile device 800 may include a processing means such as the one or more processors 804 coupled to the interconnect 802 for processing information. The processors 804 may comprise one or more physical processors and one or more logical processors.

In some embodiments, the mobile device 800 includes one or more transmitters or receivers 816 coupled to the interconnect 802. In some embodiments, the mobile device 800 may include one or more antennas 820 for the transmission and reception of data via radio signals. In some embodiments, the data that is transmitted and received includes audio and video data to be transmitted to a remote user via a network and audio and video data received from a remote user and to be transmitted to the UAV 864.

In some embodiments, the mobile device 800 further comprises a random access memory (RAM) or other dynamic storage device or element as a main memory and other memory (including memory buffers) 806 for storing information and instructions to be executed by the processors 804. The mobile device 800 may include one or more non-volatile memory elements 808, including, for example, flash memory, for the storage of certain elements. The mobile device 800 also may comprise a read only memory (ROM) 810 or other static storage device for storing static information and instructions for the processors 804, and data storage 812, such as a solid state drive, for the storage of data.

The mobile device 800 may also comprise a battery 826 or other power source, which may include a solar cell, a fuel cell, a charged capacitor, or other system or device for providing or generating power in an apparatus. The power provided by the battery 826 may be distributed as required to elements of the mobile device 800.

In some embodiments, the mobile device 800 includes one or more input devices 822 for the input of data, including hard and soft buttons, a joy stick, a mouse or other pointing device, voice command system, or gesture recognition system. In some embodiments, the mobile device includes an output display 824, where the display 824 may include a liquid crystal display (LCD) or any other display technology, for displaying information or content to a user. In some environments, the display 824 may include a touch-screen that is also utilized as at least a part of an input device 822.

FIG. 9 is a flow chart to illustrate a process for providing communications according to an embodiment utilizing an autonomous device to send and receive visual and auditory projections. In some embodiments, upon commencing a communication between a local user and a remote user 900, such as communication that begins with a mobile device, such as a cellular telephone call, there is an initiation of an ambulatory communication session between the local user and the remote user 902. An operation to commence the ambulatory communication session may include a discovery operation to determine whether each side of the communication is capable of ambulatory communications.

In some embodiments, a local autonomous device, such as a local UAV (or multiple UAVs) of the user is engaged 904. In some embodiments, the engagement of the local UAV includes the UAV becoming airborne if the UAV is not currently in flight, and the UAV moving in position in relation to the user to perform communication operations. In some embodiments, the local UAV operates to hover and follow the local user if the local user 906. In some embodiments, the operation of an ambulatory communication session includes granting limited control of the local UAV to the remote user 908.

In some embodiments, at any time upon the end of the communication, such as by either the local user or the remote user taking action to end the communication 910, the local UAV will end operation 912, where ending operation may involve return to a resting position or charging location.

In some embodiments, the local UAV operates to record a stereo view of the local user or of a scene, where the scene may be a scene near the local user 914. In some embodiments, local audio is also recorded 916, where the local audio may be recorded by the UAV or by a mobile device working cooperatively with the UAV.

In some embodiments, audio and stereo video data is transmitted via a network to the remover user 918. The transmission may occur by a wireless connection between the UAV and a wireless network, or by the transfer of the data to a mobile device working cooperatively with the UAV, with the mobile device then transferring the data via the wireless network to the remote user.

In some embodiments, audio and stereo video data is received from the remote user via the wireless network 920. In some embodiments, the audio and stereo video may be received directly by the UAV, or may be received by a mobile device working cooperatively with the UAV. In some embodiments, the UAV operates to provide the received stereo video from the remote user via laser projection, such as a VRD system, to the local user 922, and to provide the received audio from the remote user via a narrowly focused audio projection to the local user 924.

In some embodiments, because of the granting of limited control of the UAV to the remote user 908, upon a command from the remote user to move the UAV 926, such as a command generated by the remote user changing a direction a view or providing a voice or gesture command, the position or direction of view of the local UAV may be shifted 928.

In the description above, for the purposes of explanation, numerous specific details are set forth in order to provide a thorough understanding of the described embodiments. It will be apparent, however, to one skilled in the art that embodiments may be practiced without some of these specific details. In other instances, well-known structures and devices are shown in block diagram form. There may be intermediate structure between illustrated components. The components described or illustrated herein may have additional inputs or outputs that are not illustrated or described.

Various embodiments may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various embodiments may be provided as a computer program product, which may include a computer-readable medium having stored thereon computer program instructions, which may be used to program a computer (or other electronic devices) for execution by one or more processors to perform a process according to certain embodiments. The computer-readable medium may include, but is not limited to, magnetic disks, optical disks, compact disk read-only memory (CD-ROM), and magneto-optical disks, read-only memory (ROM), random access memory (RAM), erasable programmable read-only memory (EPROM), electrically-erasable programmable read-only memory (EEPROM), magnet or optical cards, flash memory, or other type of computer-readable medium suitable for storing electronic instructions. Moreover, embodiments may also be downloaded as a computer program product, wherein the program may be transferred from a remote computer to a requesting computer.

Many of the methods are described in their most basic form, but processes can be added to or deleted from any of the methods and information can be added or subtracted from any of the described messages without departing from the basic scope of the present embodiments. It will be apparent to those skilled in the art that many further modifications and adaptations can be made. The particular embodiments are not provided to limit the concept but to illustrate it. The scope of the embodiments is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example of the present invention. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments, various features are sometimes grouped together in a single embodiment, figure, or description thereof for the purpose of streamlining the disclosure and aiding in the understanding of one or more of the various novel aspects. This method of disclosure, however, is not to be interpreted as reflecting an intention that the claimed embodiments requires more features than are expressly recited in each claim. Rather, as the following claims reflect, novel aspects lie in less than all features of a single foregoing disclosed embodiment. Thus, the claims are hereby expressly incorporated into this description, with each claim standing on its own as a separate embodiment.

In some embodiments, an apparatus for ambulatory communication includes a propulsion system to enable the apparatus to fly, including hovering in place and following a user; a stereo camera to record an image of a user of the apparatus or a scene nearby the user of the apparatus; a transmitter to transmit video data generated by the stereo camera to a second apparatus via network for a communication with a remote user; a receiver to receive video data via the network from the remote user; and a video projection mechanism to project an image including the received video to the user.

In some embodiments, the image projected to the user includes an image of the remote user.

In some embodiments, the apparatus is to operate cooperatively with a mobile device. In some embodiments, the transmitter is to transmit the video data via the mobile device to the network. In some embodiments, the receiver is to receive video data and audio data via the mobile device from the network.

In some embodiments, the video projection mechanism is to project an image using a laser projection. In some embodiments, the video projection mechanism is a Virtual Retinal Display (VRD).

In some embodiments, the apparatus further includes an audio projection mechanism to project audio data to the user, wherein the receiver is further to receive the audio data via the network, and wherein the audio projection mechanism is to project audio to the user in a focused manner.

In some embodiments, a system for ambulatory communication includes a first set of one or more unmanned aerial vehicles UAVs for operation with a first user; and a second set of one or more UAVs for operation with a second user. In some embodiments, the first set of UAVs and the second set of UAVs are operable to support a communication session between the first user and the second user, wherein each of the sets of UAVs includes: a stereo camera to record an image of the user of the apparatus or a scene nearby the user of the apparatus, a transmitter to transmit video data generated by the stereo camera to the other UAV, a receiver to receive video data via the network from the other UAV, and a video projection mechanism to project an image including the received video to the user of the UAV.

In some embodiments, the system further includes a first mobile device to operate cooperatively with the first set of UAVs and a second mobile device to operate cooperatively with the second set of UAVs. In some embodiments, each set of UAVs is to transmit data via the respective mobile device, and wherein each set of UAVs is to receive data via the respective mobile device. In some embodiments, the first mobile device is operable to record audio from the first user and the second mobile device is operable to record audio from the second user.

In some embodiments, the system further includes a first mobile device to operate cooperatively with the first set of UAVs and a second mobile device to operate cooperatively with the second set of UAVs, wherein the first mobile device is operable to record audio from the first user and the second mobile device is operable to record audio from the second user, and each set of UAVs transmits data via the respective mobile device, and wherein each set of UAVs receives data via the respective mobile device.

In some embodiments, the video projection mechanism of the first or second set of UAVs projects a blended reality image, the blended reality image including a first video image that has been recorded by the other set of UAVs and a second video image that has not been recorded by either the first or second set UAVs. In some embodiments, the second video image is an image of a location in which neither the first user nor the second user is located.

In some embodiments, the receiver of each of the sets of UAVs is further to receive audio data via the network from the other set of UAVs, wherein each of the sets of UAVs further includes an audio projection mechanism to project the audio data to the user of the set of UAVs.

In some embodiments, a set of one or more UAVs includes a plurality of UAVs, and each of the plurality of UAVs is operable to communicate with one or more of the other UAVs of the plurality of UAVs.

In some embodiments, the receiver of each of the sets of UAVs is further to receive audio data via the network from the other set of UAVs, wherein each of the sets of UAVs further includes an audio projection mechanism to project the audio data to the user of the set of UAVs.

A method including commencing a communication between a local user and a remote user; initiating an ambulatory communication session for the local user and the remote user; enabling at least one autonomous device, wherein each autonomous device is operable to hover and follow the local user; recording by the at least one autonomous device a stereo image of the local user or a scene; and transmitting data for the recorded stereo to a remote device for the remote user. In some embodiments, the at least one autonomous device is a UAV.

In some embodiments, the method further includes stereo video data from the remote device; projecting to the local user by the at least one autonomous device an image including the received stereo video data; and projecting to the local user by the at least one autonomous device audio including the received audio data. In some embodiments, the image projected to the local user is a blended image including a first image recorded by the remote user and a second image that is not recorded by the second device.

In some embodiments, the method further includes recording audio of the local user; transmitting data for the recorded audio to the remote user; receiving audio data from the remote user; and projecting to the local user by the at least one autonomous device audio including the received audio data.

In some embodiments, the recording of the audio of the local user is performed by the at least one autonomous device.

In some embodiments, the recording of the audio of the local user is performed using a mobile device operated by the local user, the mobile device operating cooperatively with the at least one autonomous device.

In some embodiments, functions of the at least one autonomous device are provided by a single autonomous device.

In some embodiments, functions of the at least one autonomous device are provided by a plurality of autonomous devices.

In some embodiments, machine-readable storage includes machine-readable instructions that, when executed, implement the method.

In some embodiments, a non-transitory computer-readable storage medium includes instructions for commencing a communication between a local user and a remote user; initiating an ambulatory communication session for the local user and the remote user; enabling at least one autonomous device, wherein each autonomous device is operable to hover and follow the local user; recording by the at least one autonomous device a stereo image of the local user or a scene; and transmitting data for the recorded stereo image to the remote user. In some embodiments, the at least one autonomous device is a UAV.

In some embodiments, the medium further includes instructions for receiving stereo video data from the remote user; and projecting to the local user by the at least one autonomous device an image including the received stereo video data.

In some embodiments, the medium further includes instructions for recording audio of the local user; transmitting data for the recorded audio to the remote device; receiving audio data from the remote device; and projecting to the local user by the at least one autonomous device audio including the received audio data.

In some embodiments, the medium further includes instructions for stitching together a first image recorded by the remote user and a second image that is not recorded by the remote user, the blended image being the image projected to the local user by the at least one autonomous device. In some embodiments, the first image is an image of the remote user and the second image is an image of a location in which the local user and the remote user are not located.

In some embodiments, an apparatus includes means for commencing a communication between a local user and a remote user; means for initiating an ambulatory communication session for the local user and the remote user; means for enabling at least one autonomous device, wherein each autonomous device is operable to hover and follow the local user; means for recording by the at least one autonomous device a stereo image of the local user or a scene; and means for transmitting data for the recorded stereo image and the recorded audio to a remote device of the remote user. In some embodiments, the at least one autonomous device is a UAV.

In some embodiments, the apparatus further includes means for receiving video data from the remote device; and means for projecting to the local user by the at least one autonomous device an image including the received stereo video data.

In some embodiments, the apparatus further includes means for receiving audio data from the remote device; means for projecting to the local user by the at least one autonomous device audio including the received audio data.

In some embodiments, the apparatus further includes means for recording audio of the local user; and means for transmitting data for the audio to the remote device.

In some embodiments, the apparatus further includes means for stitching together a first image recorded by the remote user and a second image that is not recorded by the remote user, the blended image being the image projected to the local user by the at least one autonomous device.

What is claimed is:

1. An apparatus for ambulatory communication comprising:
   a propulsion system to enable the apparatus to fly, including to hover in place and to follow a user;
   a stereo camera to record an image of a user of the apparatus or a scene nearby the user of the apparatus;
   a transmitter to transmit video data generated by the stereo camera to a second apparatus via network for a communication with a remote user;
   a receiver to receive video data via the network from the second apparatus; and
   a video projection mechanism to project an image including the received video from the apparatus directly onto an eye or eyes of the user using a laser projection;
   wherein the apparatus does not include a projection screen, and wherein the image is viewable by the user without use of virtual reality goggles or other wearable element.

2. The apparatus of claim 1, wherein the image projected directly onto the eye or eyes of the user includes an image of the remote user.

3. The apparatus of claim 1, wherein the apparatus is to operate cooperatively with a mobile device.

4. The apparatus of claim 3, wherein the transmitter is to transmit the video data via the mobile device to the network and the receiver is to receive video data via the mobile device from the network.

5. The apparatus of claim 1, wherein the video projection mechanism is a Virtual Retinal Display (VRD).

6. The apparatus of claim 1, further comprising an audio projection mechanism to project audio data to the user, wherein the receiver is further to receive the audio data via the network, and wherein the audio projection mechanism is to project audio to the user utilizing heterodyning in a focused beam such that only the user is able to hear the audio.

7. A system for ambulatory communication comprising:
   a first set of one or more unmanned aerial vehicles (UAVs) for operation with a first user; and
   a second set of one or more UAVs for operation with a second user;
   wherein the first set of UAVs and the second set of UAVs are operable to support a communication session between the first user and the second user;
   wherein each of the sets of UAVs includes:
      a stereo camera to record an image of the user of the apparatus or a scene nearby the user of the apparatus,
      a transmitter to transmit video data generated by the stereo camera to the other set of UAVs,
      a receiver to receive video data via the network from the other set of UAVs, and
      a video projection mechanism to project an image including the received video directly from the video projection mechanism onto an eye or eyes of the user of the set of UAVs using a laser projection;
   wherein the system does not include a projection screen, and wherein the image is viewable by the user without use of virtual reality goggles or other wearable element.

8. The system of claim 7, further comprising a first mobile device to operate cooperatively with the first set of UAVs and a second mobile device to operate cooperatively with the second set of UAVs.

9. The system of claim 8, wherein each set of UAVs is to transmit data via the respective mobile device, and wherein each set of UAVs is to receive data via the respective mobile device.

10. The system of claim 8, wherein the first mobile device is operable to record audio from the first user and the second mobile device is operable to record audio from the second user.

11. The system of claim 7, wherein the video projection mechanism of the first or second set of UAVs is to project a blended reality image directly onto the eye or eyes of the respective user, the blended reality image including a first video image that has been recorded by the other set of UAVs and a second video image that has not been recorded by either the first or second set of UAVs.

12. The system of claim 11, wherein the second video image is an image of a location in which neither the first user or the second user is located.

13. The system of claim 7, wherein the receiver of each of the sets of UAVs is further to receive audio data via the network from the other set of UAVs, wherein each of the sets of UAVs further includes an audio projection mechanism to project the audio data to the user of the set of UAVs.

14. A method comprising:
   commencing a communication between a local user and a remote user;
   initiating an ambulatory communication session for the local user and the remote user;
   enabling at least one autonomous device, wherein each autonomous device is operable to hover and follow the local user;
   recording by the at least one autonomous device a stereo image of the local user or a scene;
   transmitting data for the recorded stereo image to a remote device for the remote user;
   receiving stereo video data from the remote device; and
   projecting to the local user by the at least one autonomous device an image including projecting the received stereo video data directly onto an eye or eyes of the local user using a laser projection;
   wherein the projection of the image does not include a projection screen, and wherein the image is viewable by the user without use of virtual reality goggles or other wearable element.

15. The method of claim 14, wherein the image projected directly onto the eye or eyes of the local user is a blended image including a first image recorded by the remote device and a second image that is not recorded by the remote device.

16. The method of claim 14, further comprising:
recording audio of the local user;
transmitting data for the recorded audio to the remote user;
receiving audio data from the remote user; and
projecting to the local user by the at least one autonomous device audio including the received audio data.

17. The method of claim 16, wherein the recording of the audio of the local user is performed by the at least one autonomous device.

18. The method of claim 16, wherein the recording of the audio of the local user is performed using a mobile device operated by the local user, the mobile device to operate cooperatively with the at least one autonomous device.

19. A non-transitory computer-readable storage medium having stored thereon data representing sequences of instructions that, when executed by a processor, cause the processor to perform operations comprising:
commencing a communication between a local user and a remote user;
initiating an ambulatory communication session for the local user and the remote user;
enabling at least one autonomous device, wherein each autonomous device is operable to hover and follow the local user;
recording by the at least one autonomous device a stereo image of the local user or a scene;
transmitting data for the recorded stereo image and the recorded audio to a remote device for the remote user;
receiving stereo video data from the remote device; and
projecting to the local user by the at least one autonomous device an image including projecting the received stereo video data directly onto an eye or eyes of the local user using a laser projection;
wherein the projection of the image does not include a projection screen, and wherein the image is viewable by the user without use of virtual reality goggles or other wearable element.

20. The medium of claim 19, further comprising instructions that, when executed by the processor, cause the processor to perform operations comprising:
recording audio of the local user;
transmitting data for the recorded audio to the remote device;
receiving audio data from the remote device; and
projecting to the local user by the at least one autonomous device audio including the received audio data.

21. The medium of claim 19, further comprising instructions that, when executed by the processor, cause the processor to perform operations comprising:
stitching together a first image recorded by the remote user and a second image that is not recorded by the remote user, the blended image being the image projected directly onto the eye or eyes of the local user by the at least one autonomous device.

22. The medium of claim 21, wherein the first image is an image of the remote user and the second image is an image of a location in which the local user and the remote user are not located.

23. A system for ambulatory communication comprising:
a first set of one or more unmanned aerial vehicles (UAVs) for operation with a first user; and
a second set of one or more UAVs for operation with a second user; wherein the first set of UAVs and the second set of UAVs are operable to support a communication session between the first user and the second user;
wherein the first set of one or more UAVs are subject to control for a service by the second user upon granting of permission for such control by the first user; and wherein each of the sets of UAVs includes:
a stereo camera to record an image of the user of the apparatus or a scene nearby the user of the apparatus,
a transmitter to transmit video data generated by the stereo camera to the other set of UAVs,
a receiver to receive video data via the network from the other set of UAVs, and a video projection mechanism to project an image including the received video directly from the video projection mechanism onto an eye or eyes of the user of the set of UAVs using a laser projection;
wherein the apparatus does not include a projection screen, and wherein the image is viewable by the user without use of virtual reality goggles or other wearable element.

24. The system of claim 23, further comprising a first mobile device to operate cooperatively with the first set of UAVs and a second mobile device to operate cooperatively with the second set of UAVs.

25. The system of claim 24, wherein each set of UAVs is to transmit data via the respective mobile device, and wherein each set of UAVs is to receive data via the respective mobile device.

26. The system of claim 24, wherein the first mobile device is operable to record audio from the first user and the second mobile device is operable to record audio from the second user.

* * * * *